Figure 1:
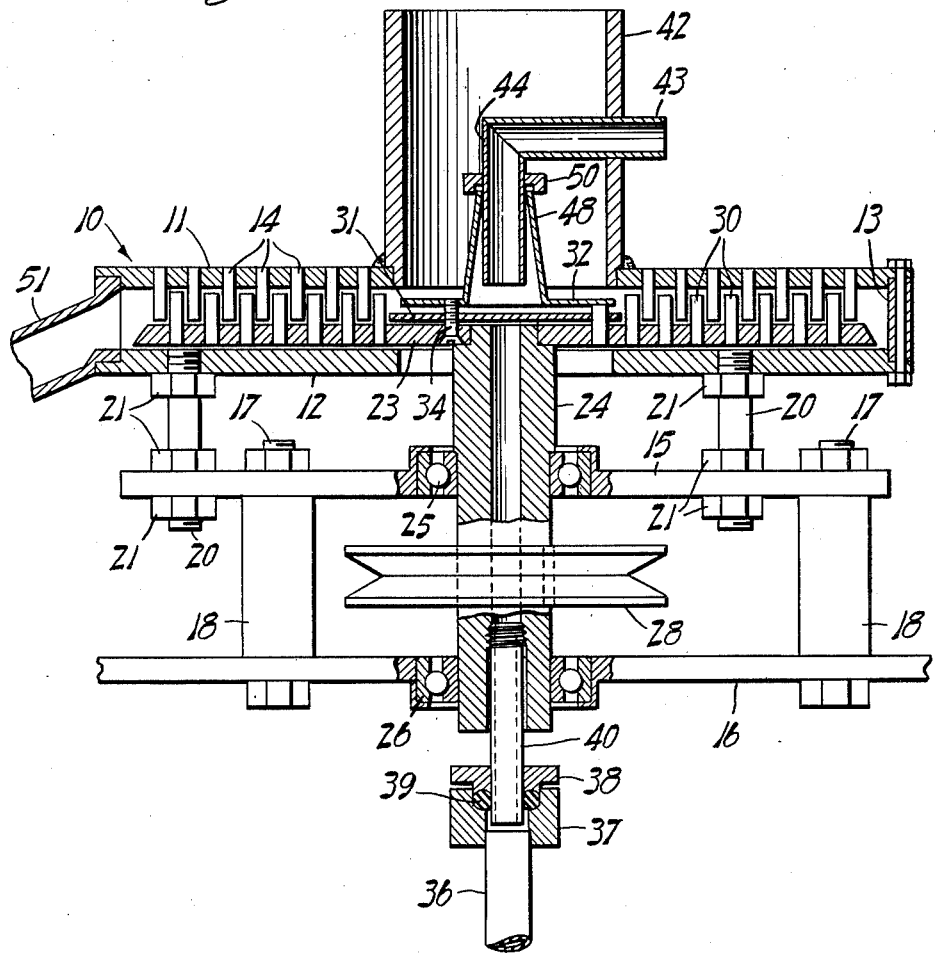

May 26, 1953

R. R. TEALE 2,639,901

PIN MIXER

Filed Nov. 20, 1951

2 Sheets-Sheet 1

INVENTOR.
ROBERT R. TEALE
BY
Bean, Brooks, Buckley & Bean
ATTORNEYS

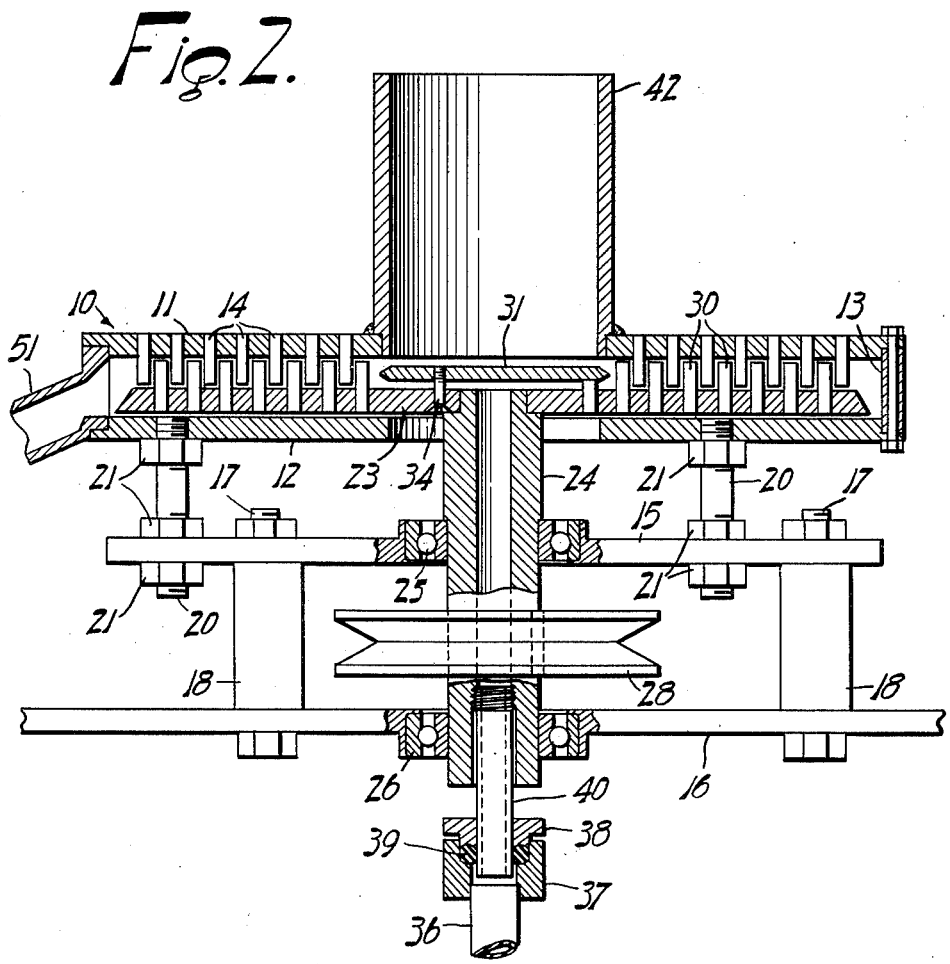

Patented May 26, 1953

2,639,901

UNITED STATES PATENT OFFICE 2,639,901

PIN MIXER

Robert R. Teale, Snyder, N. Y., assignor to National Gypsum Company, Buffalo, N. Y.

Application November 20, 1951, Serial No. 257,259

9 Claims. (Cl. 259—8)

1

This invention relates to mixers and has particular reference to mixers for preparing slurries of finely divided solid materials and water or other liquids.

The principles of the mixers of the present invention may be applied in mixing various materials, but its advantages are well exemplified in connection with the preparation of slurries for the manufacture of gypsum products. The construction and operation of mixers embodying the principles of the present invention will be described in connection with such use by way of example.

One of the most common operations is that followed in the manufacture of plaster lath and wallboard wherein calcined gypsum or stucco and water are mixed to form a slurry of gypsum plaster. A common practice in this field is to add another constituent to produce voids in the ultimate product to reduce its specific gravity. One way of accomplishing this result is to add foam as a separate ingredient. In one form the mixer of the present invention is arranged specially to efficiently introduce and commingle three or more constituents, as for instance stucco, water and foam.

The principles of the present invention are particularly adaptable to mixers of the type known in the art as pin mixers wherein the mixer is in the form of a relatively flat cylinder mounted on a vertical axis with the materials moving through the mixer as a combined result of the force of gravity and centrifugal force and discharging near an edge or peripheral portion of the mixer casing. In such mixers it is customary to introduce the calcined gypsum or stucco and the water at different points located somewhat in the vicinity of the center of the mixer, but conventional construction is such that it is usual to have these two feed entrances disposed separately and each located eccentrically of the center of the mixing chamber and eccentrically of the axis of rotation of the mixing rotor.

Ordinarily the shaft of the mixing rotor and its supporting bearings require that the separate entrance orifices for gypsum and water be located at points spaced from the central region of the mixer. This design and construction, while generally conventional in this art, results in certain undesirable unevenness and inequality in mixing results, since the radial path from the point where the gypsum is introduced to the periphery of the mixer is unequal in various directions, the radial path from the point where

2 the water is introduced to the periphery of the mixer in various directions is unequal, and the paths of the two materials are not the same in various directions.

Furthermore, in mixers of the prior art, it was conventionally considered necessary to employ a separate supplemental mixer to add the foam or foaming agent. The usual present practice is to pass the mixed slurry of gypsum and water to a supplemental ball mixer where the foam is introduced and blended with the slurry. In the form of the present invention wherein three or more ingredients may be introduced and uniformly commingled and mixed this supplemental mixer and the supplemental mixing step may be entirely eliminated.

The mixer of the present invention is so arranged and constructed that it is possible to introduce both the calcined gypsum or stucco and the water centrally of the mixer and in such a way that their paths and the lengths of their paths in all radial directions to the periphery of the mixer are entirely uniform. Further, this arrangement results in all of the calcined gypsum or stucco being supplied with water at the same distance from the axis of the mixer and results in all of the calcined gypsum being supplied with absolutely uniform relative quantities of water.

In the embodiments of the invention which are set forth herein by way of example this result is achieved by introducing both the calcined gypsum and water through conduits which are concentric with the axis of the mixer. In the case of the three-ingredient form of the mixer, all three constituents are introduced concentrically, as will appear from the specific examples of the present invention which are illustrated in the drawings and described in detail in the following specification.

Various mechanical modifications of the mixer of the present invention may be made without departing from the principles of the present invention. Specific embodiments are illustrated in the drawings and described herein merely by way of example but the present invention is not limited thereto or otherwise, excepting as defined in the appended claims.

In the drawings:

Fig. 1 is a cross-sectional view taken on a vertical plane through the axis of one form of the mixer of the present invention; and Fig. 2 is a similar view of another form of the mixer of the present invention.

Like characters of reference denote like parts and, referring now to the embodiment illustrated in Fig. 1, the numeral 10 designates a flat cylindrical casing having radial top and bottom walls 11 and 12, respectively, and a circular side wall 13. The top wall 13 of casing 10 is provided with a number of concentric circular series of stationary depending pins 14.

A pair of vertically spaced horizontal supports are designated 15 and 16 and these supports may be part of a rigid supporting framework which straddles a moving conveyor belt on which wallboard or the like is formed. The details of this framework are not relevant to the present invention. As shown in Fig. 1, the supports 15 and 16 are in rigid relative positions by tierods or studs 17 and spacing sleeves 18. The bottom wall 12 of casing 10 is, in turn, held in fixed position with respect to support 15 by means of tierods or studs 20 and suitable lock nuts 21.

The mixing rotor comprises generally a flat disk 23 having a downwardly extending mounting shaft portion 24 which has anti-friction bearing support in supports 15 and 16 by virtue of ball bearings designated 25 and 26, respectively. A drive pulley 28 is shown fixed to shaft 24 and any desired form of drive transmission for shaft 24 may be utilized.

Rotor 23 is provided with a number of concentric circular series of upstanding pins 30 which are disposed at such radii as not to interfere with the stationary pins 14 but which extend upwardly between the circular rows of pins 14 as appears clearly in Fig. 1.

It will be noted that a disk 31 and an annular plate 32 are fixed relative to rotor 23 and are secured for rotation therewith by screws 34. Disk 31 is spaced slightly above the top surface of rotor 23 and annular plate 32 is, in turn, spaced above the top of disk 31. In the illustrated instance, disk 31 is solid and shaft 24 is hollow to provide fluid communication to the under side of disk 31.

To provide free fluid or other material feeding communication between a fluid or material source and the interior of the rotating shaft, various commercial adaptors or connectors may be employed. Merely by way of illustration, Fig. 1 shows a stationary supply pipe 36 having a head portion 37 and a rotatable bushing 38. A fluid seal is designated 39 and a pipe 40 which is fixed in bushing 38 extends upwardly and is threaded into shaft 23 for rotation therewith. In the present case, by way of example, the material feeding through shaft 24 may be water.

The top wall 11 of the mixing chamber is provided with a central conduit 42 for introducing a downward flow of material, for instance, dry calcined gypsum or stucco. A second conduit 43 is fixed to conduit 42 in any desired manner and its terminal portion extends downwardly centrally of the mixer and centrally of conduit 42, as at 44 in Fig. 1.

The material feeding in through conduit 43, 44 and falling therefrom through the central opening in disk 32 and onto the surface of disk 31 flows outwardly thereon uniformly in all radial directions under the influence of centrifugal force. Likewise, the material falling to the top surface of annular plate 32 from conduit 42 spreads uniformly in all radial directions under centrifugal force and the pressure thereon of material in the conduit 42.

A shielding or separating sleeve 48 which is also coaxial with the conduit 42 and with the axis of rotor 23 is mounted fixedly on annular plate 32 and surrounds the central aperture therein. Sleeve 48 may be tapered as shown in Fig. 1 so that its upper end lies close to but spaced from conduit portion 44. A cap 50 extends over the upper end of sleeve 48 and in the illustrated instance is fixed to the downwardly extending portion 44 of conduit 43.

Cap 50 is provided with an annular depending flange which extends downwardly over the upper end of sleeve 48, so that sleeve 48 and cap 50 serve to isolate the flow of calcined gypsum or stucco and the flow of foam, in the instance given by way of example, until the materials reach the outer edge of annular plate 32 where they are substantially at the innermost circular series of mixing pins. However, sleeve 48 and cap 50 are out of contact so that free rotation of sleeve 48 relative to the cap is not interfered with.

Also, the outward flow of water beneath disk 31 is independent of the radial outward feeding of the other two ingredients until the water passes beyond the edge of disk 31, likewise substantially at the innermost mixing pins. The three materials are thus initially commingled in a highly uniform manner in an annular zone at the circular edges of disk 31 and annular plate 32.

The flow of mixing water, gypsum, and foam from the center of the mixer toward the periphery is thus entirely uniform in all directions about the axis of the mixer both as to quantity and proportions and the rate of flow is substantially uniform because of these equal values and the uniform centrifugal forces on the materials. The mixed material, after passing radially beyond the various intermeshing mixing pins 14 and 30, may be discharged in any desired manner and at any number of points around the periphery of the mixer. In the present instance, and by way of example only, a discharge spout is designated 51 in Fig. 1.

Referring now to the embodiment illustrated in Fig. 2, like numerals may be employed as in the case of Fig. 1, since the only distinction between the two embodiments lies in the fact that the conduits for feeding the third ingredient are omitted from the embodiment of Fig. 2. The description of parts need not be duplicated since Fig. 2 differs from Fig. 1 only in the omission of disk 32 and its function and the omission of the elements 43, 44, 48 and 50 which cooperate with disk 32. In Fig. 2 the material from conduit 42 discharges upon disk 31 and the two materials, stucco and water, for instance, feed from above and below, respectively, and commingle at the edge of disk 31.

In the foregoing specification and the following claims, the terms "pin mixer" and "mixing pins" are employed and the pins 14 and 18 are usually of circular cross-section. However, it is to be understood that the term "pin" is used in a generic sense, and that the pins or bars may be of square or rectangular cross-section or otherwise, that various combinations of pins and bars may be employed, and that the claims are to be construed in that light.

What is claimed is:

1. In a pin mixer, a casing forming an annular mixing chamber, a plurality of pins extending downwardly from an upper radial wall thereof, a discoidal rotor in said chamber having a generally vertical axis, a plurality of pins extending upwardly from said rotor and projecting between the downwardly extending pins, a central feed conduit entering said chamber through said upper radial wall, a drive shaft extending downwardly from said rotor and emerging from said mixing chamber, an axial passage in said drive shaft emerging in said mixing chamber at the upper surface of said rotor, and a horizontal disk concentric with said vertical axis and fixed to and spaced above said rotor, whereby materials feeding through said conduit and through said passage move radially outwardly uniformly in all directions and commingle after they pass the periphery of said disk.

2. In a mixer, a cylindrical casing forming a mixing chamber having upper and lower radial walls, a discoidal rotor in said chamber having a generally vertical axis, a central feed conduit entering said chamber through the upper radial wall thereof, a drive shaft extending downwardly from said rotor through the lower radial wall of the mixing chamber, an axial passage in said drive shaft emerging in said mixing chamber at the upper surface of said rotor, and a horizontal disk concentric with said vertical axis and fixed to and spaced above said rotor for rotation therewith, whereby materials feeding through said conduit and through said passage move radially outwardly uniformly in all directions above and below said disk respectively and commingle after they pass the periphery of said disk.

3. In a mixer, a generally cylindrical casing forming a mixing chamber having upper and lower radial walls, a discoidal rotor in said chamber having a generally vertical axis, a central feed conduit entering said chamber through one of said radial walls, a drive shaft fixed to and extending from said rotor through the other of said radial walls, an axial passage in said drive shaft and extending through said rotor, and a horizontal disk concentric with said vertical axis and fixed to said rotor for rotation therewith, said disk being spaced vertically between the first-mentioned radial wall and said rotor whereby materials feeding through said conduit and through said passage move radially outwardly uniformly in all directions at opposite sides of said disk and commingle after they pass the periphery of said disk.

4. In a pin mixer, a generally cylindrical casing forming an annular mixing chamber having upper and lower radial walls, a plurality of pins extending inwardly of said chamber from one of said radial walls, a discoidal rotor in said chamber having a generally vertical axis, a plurality of pins extending from said rotor and projecting between the first-mentioned pins, a central feed conduit entering said chamber through said one radial wall, a drive shaft fixed to said rotor and extending through the other of said radial walls, an axial passage in said drive shaft and extending through said rotor, and a horizontal disk concentric with said vertical axis and fixed to said rotor for rotation therewith, said disk being spaced vertically between the first-mentioned radial wall and said rotor whereby materials feeding through said conduit and through said passage move radially outwardly uniformly in all directions and commingle after they pass the periphery of said disk.

5. In a pin mixer, a casing forming an annular mixing chamber, a plurality of pins extending downwardly from an upper radial wall thereof, a discoidal rotor in said chamber having a generally vertical axis, a plurality of pins extending upwardly from said rotor and projecting between the downwardly extending pins, a central feed conduit entering said chamber through said upper radial wall, a drive shaft extending downwardly from said rotor and emerging from said mixing chamber, a feeding passage in said drive shaft emerging in said mixing chamber at the upper surface of said rotor, and a horizontal disk concentric with said vertical axis and spaced between said upper radial wall and said rotor, whereby materials feeding through said conduit and through said passage move radially outwardly at opposite sides of said disk and commingle after they pass the periphery of said disk.

6. In a mixing device, a casing forming an annular mixing chamber, a discoidal rotor therein having a substantially vertical axis, rotary drive means at the under side of said rotor, an inlet conduit disposed above said casing and communicating with said mixing chamber centrally thereof through the upper wall of said chamber, and a second inlet conduit extending downwardly into said mixing chamber within said first conduit and centrally thereof, whereby both conduits discharge material uniformly coaxially in said chamber, means extending about said second conduit and including an annular plate underlying the discharge portion of the first conduit, a disk underlying said plate, and an axial passage through said drive means and said rotor leading to the under side of said disk, whereby material feeding into the mixing chamber from said first conduit moves radially outwardly above said annular plate, material feeding into the mixing chamber from said second conduit moves radially outwardly between said plate and said disk, and material feeding into said mixing chamber from said axial passage moves radially outwardly below said disk, the materials commingling only after passing radially outwardly beyond said plate and said disk.

7. In a mixing device, a casing forming an annular mixing chamber having upper and lower radial walls, a discoidal rotor therein having a substantially vertical axis, rotary drive means at one side of said rotor and extending out of said casing through one of said radial walls, an inlet conduit communicating with said mixing chamber centrally thereof through the other of said radial walls, and a second inlet conduit extending axially into said mixing chamber within said first conduit and centrally thereof, whereby both conduits discharge material uniformly coaxially in said chamber, means extending about said second conduit and including an annular plate spaced axially from the discharge portion of the first conduit, a concentric disk spaced axially from said plate toward said one radial wall, and an axial passage through said drive means and said rotor leading to the space between said rotor and said disk, whereby material feeding into the mixing chamber from said first conduit moves radially outwardly at one side of said annular plate, material feeding into the mixing chamber from said second conduit moves radially outwardly between said plate and said disk, and material feeding into said mixing chamber from said axial passage moves radially outwardly between said disk and said rotor, the materials commingling only after passing radially outwardly beyond said plate and said disk.

8. In a pin mixer, a casing forming an annular mixing chamber, a plurality of pins extending downwardly from an upper radial wall thereof, a discoidal rotor therein having a substantially vertical axis, a plurality of pins extending upwardly from said rotor and projecting between the downwardly extending pins, rotary drive means at the under side of said rotor, an inlet conduit disposed above said casing and communicating with said mixing chamber centrally thereof through the upper wall of said chamber, and a second inlet conduit extending downwardly into said mixing chamber within said first conduit and centrally thereof, whereby both conduits discharge material uniformly coaxially in said chamber, means extending about said second conduit and including an annular plate underlying the discharge portion of the first conduit, a disk underlying said plate, and an axial passage through said drive means and said rotor leading to the under side of said disk, whereby material feeding into the mixing chamber from said first conduit moves radially outwardly above said annular plate, material feeding into the mixing chamber from said second conduit moves radially outwardly between said plate and said disk, and material feeding into said mixing chamber from said axial passage moves radially outwardly below said disk, the materials commingling only after passing radially outwardly beyond said plate and said disk.

9. In a pin mixer, a casing forming an annular mixing chamber having upper and lower radial walls, a plurality of pins extending inwardly of said chamber from one of said radial walls, a discoidal rotor therein having a substantially vertical axis, a plurality of pins extending from said rotor and projecting between the first-mentioned pins, rotary drive means at one side of said rotor and extending out of said casing through the other radial wall thereof, an inlet conduit communicating with said mixing chamber centrally thereof through said one radial wall, and a second inlet conduit extending axially into said mixing chamber within said first conduit and centrally thereof, whereby both conduits discharge material uniformly coaxially in said chamber, means extending about said second conduit and including an annular plate spaced axially from the discharge portion of the first conduit, a disk spaced axially from said plate toward said other radial wall, and an axial passage through said drive means and said rotor leading to the space between said rotor and said disk, whereby material feeding into the mixing chamber from said first conduit moves radially outwardly at one side of said annular plate, material feeding into the mixing chamber from said second conduit moves radially outwardly between said plate and said disk, and material feeding into said mixing chamber from said axial passage moves radially outwardly between said disk and said rotor, the materials commingling only after passing radially outwardly beyond said plate and said disk.

ROBERT R. TEALE.

References Cited in the file of this patent

UNITED STATES PATENTS

| Number | Name | Date |
|---|---|---|
| 2,788,345 | Skirvin | Jan. 6, 1931 |
| 2,009,957 | Esch | July 30, 1935 |
| 2,146,776 | Strominger | Feb. 14, 1939 |
| 2,437,917 | Hoeh | Mar. 16, 1948 |